(12) United States Patent
Kumar et al.

(10) Patent No.: US 8,656,422 B2
(45) Date of Patent: Feb. 18, 2014

(54) METHOD AND APPARATUS FOR MANAGING TARGETED ADVERTISEMENTS FOR A LINEAR TELEVISION SERVICE

(75) Inventors: Ranjeet Kumar, Sasaram (IN); Ramy S. Ayoub, Arlington Heights, IL (US); Lei Cao, Shi Jia Zhuang (CN); Jiong Li, Singapore (SG); Mohammed Safiq Mohammed Iqbal, Coimbatore (IN); Hui Shen, Singapore (SG); Kok Meng Wong, Singapore (SG)

(73) Assignee: Motorola Mobility LLC, Libertyville, IL (US)

( * ) Notice: Subject to any disclaimer, the term of this patent is extended or adjusted under 35 U.S.C. 154(b) by 169 days.

(21) Appl. No.: 13/012,849

(22) Filed: Jan. 25, 2011

(65) Prior Publication Data

US 2012/0192222 A1    Jul. 26, 2012

(51) Int. Cl.
*H04N 7/10* (2006.01)
(52) U.S. Cl.
USPC ............... 725/24; 725/32; 725/35; 725/36
(58) Field of Classification Search
USPC .............................. 725/32, 34–36
See application file for complete search history.

(56) References Cited

U.S. PATENT DOCUMENTS

| | | | |
|---|---|---|---|
| 6,738,978 B1 | 5/2004 | Hendricks et al. | |
| 6,971,119 B1 | 11/2005 | Arsenault et al. | |
| 7,610,597 B1 | 10/2009 | Johnson et al. | |
| 7,613,691 B2 | 11/2009 | Finch | |
| 7,676,405 B2 | 3/2010 | Steelberg et al. | |
| 7,779,446 B2 | 8/2010 | Westbrook et al. | |
| 8,434,103 B2 | 4/2013 | Tsuchida et al. | |
| 2008/0033881 A1 | 2/2008 | Ficco | |
| 2008/0034276 A1 | 2/2008 | Ficco | |
| 2009/0158341 A1 | 6/2009 | Miller | |
| 2009/0217316 A1* | 8/2009 | Gupta | 725/32 |
| 2009/0271819 A1 | 10/2009 | Cansler et al. | |
| 2010/0107188 A1 | 4/2010 | Van Hoff | |
| 2010/0153993 A1* | 6/2010 | Konig et al. | 725/34 |
| 2010/0179867 A1 | 7/2010 | Hughes et al. | |
| 2010/0281499 A1* | 11/2010 | Harville | 725/32 |
| 2011/0041151 A1 | 2/2011 | Cristofalo et al. | |
| 2011/0061073 A1 | 3/2011 | Nicholson et al. | |
| 2011/0317079 A1 | 12/2011 | McRae | |
| 2012/0023522 A1* | 1/2012 | Anderson et al. | 725/35 |
| 2012/0216224 A1 | 8/2012 | Rajagopal et al. | |

OTHER PUBLICATIONS

ETSI TS 182 027 v3.4.1, "Telecommunications and Internet Converged Services and Protocols for Advanced Networking (TISPAN); IPTV Architecture; IPTV functions supported by the IMS subsystem", (Jun. 2010), all pages.

(Continued)

*Primary Examiner* — Hunter B Lonsberry (57) ABSTRACT

A method and apparatus for managing targeted advertisements for linear television is provided herein. During operation a client device will determine whether or not an advertisement opportunity duration is known, unknown, or variable. Based on this determination, advertisements that best match the advertisement opportunity duration will be chosen via separate algorithms. More particularly, a first algorithm will be used to choose advertisements when the advertisement opportunity duration is known, a second algorithm will be used to choose advertisements when the advertisement opportunity duration is unknown, and a third algorithm will be used to choose advertisements when the advertisement opportunity duration is variable.

13 Claims, 4 Drawing Sheets

(56) References Cited

OTHER PUBLICATIONS

Wikipedia, "Knapsack problem", available at URL en.wikipedia.org/w/index.php?title=Knapsack_problem&oldid=408915275, dated Jan. 20, 2011, accessed Jan. 28, 2013.

ETSI TS 182 027 v2.0.0, "Telecommunications and Internet Converged Services and Protocols for Advanced Networking (TISPAN), IPTV Architecture, IPTV Functions Supported by the IMS Subsystem", (Feb. 2008), all pages.

P. Rajagopal, "Client Based Targeted Advertising Architecture in IPTV Environments", Motorola White Paper, 2010.

Del Sordo et al., "Advertisement Distribution in a Subscriber Network" United States Patent and Trademark Office U.S. Appl. No. 13/691,174, filed Nov. 30, 2012, 32 pages.

Society of Cable Telecommunications Engineers, Inc., Engineering Committee, Digital Video Subcommittee, DVS 1016 2011, Recommended Practices for SCTE 130, Digital Program Insertion—Advertising Systems Interfaces, 2010.

QuickSpec "SeaChange Infusion Spot Manager" SeaChange International, Inc., Oct. 24, 2012, 2 pages.

QuickSpec "SeaChange Infusion 6.5 VOD ADM/ADR" SeaChange International, Inc., Aug. 14, 2012, 2 pages.

QuickSpec "SeaChange Infusion Advanced Advertising Platform" Version 6.0, SeaChange International, Inc., Jul. 10, 2012, 2 pages.

SeaChange International—News Releases "SeaChange Infusion Advanced Advertising Platform Integrates Envivio Multi-Screen Encoding for Ad Insertion on Apple Devices" Jan. 11, 2012, 2 pages.

SeaChange WhitePaper "Monetizing Multiple Screen Deployments Through Advanced Advertising" SeaChange International, Inc., Jul. 13, 2012, 8 pages.

Fuerst et al., "Enabling the Multi-screen Experience" Alcatel-Lucent Enriching Communications, vol. 2, Issue 3, 2008, 6 pages.

"The new media paradigm: TV and Internet as a single service, on any screen, over any network" Nokia Siemens Networks, 2010, 4 pages.

Nokia Siemens Networks "Ubiquity Multiscreen TV Platform Transforming the way people watch TV" Nokia Siemens Networks, 2010, 2 pages.

SeaChange Infusion Brochure, "Advanced Advertising Platform" SeaChange International, Inc. Nov. 8, 2012, 2 pages.

"Transforming the way people watch TV" Nokia Siemens Networks, Executive Summary, 2010, 5 pages.

Press Release—London, United Kingdom "Nokia Siemens Networks demonstrates simple app development, sophisticated ad targeting at London IPTV event" Mar. 22, 2011, 2 pages.

ETSI 182 027 V3.5.1 (Mar. 2011) "Telecommunications and Internet converged Services and Protocols for Advanced Networking (TISPAN); IPTV Architecture; IPTV functions supported by the IMS subsystem", 195 pages.

United States Patent and Trademark Office, "Non-Final Rejection" for U.S. Appl. No. 13/691,174 dated Jul. 8, 2013, 23 pages.

* cited by examiner

METHOD AND APPARATUS FOR MANAGING TARGETED ADVERTISEMENTS FOR A LINEAR TELEVISION SERVICE

FIELD OF THE INVENTION

The present invention relates generally to managing targeted advertisements and in particular, to a method and apparatus for managing targeted advertisements for a linear television service.

BACKGROUND OF THE INVENTION

Linear television (television) channels are multicast/broadcasted to the end users as is typically the case in fixed television environments or they may be unicast to individual clients as is typically the case in mobile television environments. Linear television service must support the ability to allow users to switch between channels including the option to "channel surf", where the user may watch just a few segments of the channel before switching channels.

It is known to provide targeted advertisements to users that are inserted in linear television content. In such systems, a client device usually receives advertisements that can be tailored to a particular user. A client based approach to targeted advertisement insertion is the most effective way to handle linear television advertisements wherein the targeted advertisements are fetched and locally inserted at the client. In a client based Advanced Advertising solution, advertisements for linear television content are downloaded from a central server and displayed to the end user based on various targeting criteria, potentially overriding existing advertisement content and/or at other positions during the linear television program. Such systems include, but are not limited to the Society of Cable Engineers (SCTE) 130 (SCTE-130) for signaling advertising information, SCTE-35 for in-band advertisement marker identification and Cable Labs ADI 3.0 for out-of-band advertisement marker identification (NPT signaling).

In many television programs an advertisement duration is unknown or variable. For example, during live sporting events, an advertisement may be played during an injury time out. In this scenario, the client device may be unaware of the duration of the time out (advertisement opportunity duration/window). Therefore, a need exists for a method and apparatus for a method and apparatus for managing targeted advertisements for a linear television service that appropriately chooses targeted advertisements when an advertisement period has an unknown duration or a variable duration.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for managing targeted advertisements for linear television is provided herein. During operation a client device will determine whether an advertisement opportunity duration is known, unknown, or variable. Based on this determination, advertisements that best match the advertisement opportunity duration will be chosen via separate algorithms. More particularly, a first algorithm will be used to choose advertisements when the advertisement opportunity duration is known, a second algorithm will be used to choose advertisements when the advertisement opportunity duration is unknown, and a third algorithm will be used to choose advertisements when the advertisement opportunity duration is variable.

Because multiple algorithms are utilized for known, unknown, and variable advertisement opportunity durations, each algorithm can be best tailored to efficiently choose advertisements for the particular scenario.

The present invention encompasses a method for managing targeted advertisements. The method comprises the steps of receiving targeted advertisements, storing the targeted advertisements as stored advertisements, and determining if an advertisement opportunity duration is known, unknown, or variable. A first algorithm is utilized to choose advertisements from the stored advertisements when the advertisement opportunity duration is known. A second algorithm is utilized to choose advertisements from the stored advertisements when the advertisement opportunity duration is unknown. A third algorithm is utilized to choose advertisements from the stored advertisements when the advertisement opportunity duration is variable.

The present invention additionally encompasses an apparatus comprising an advertisement replacement detector receiving targeted advertisements and storing the targeted advertisements as stored advertisements. The advertisement replacement detector determines if an advertisement opportunity duration is known, unknown, or variable. The advertisement replacement detector utilizes a first algorithm to choose advertisements from the stored advertisements when the advertisement opportunity duration is known, utilizes a second algorithm to choose advertisements from the stored advertisements when the advertisement opportunity duration is unknown, and utilizes a third algorithm to choose advertisements from the stored advertisements when the advertisement opportunity duration is variable.

While the present invention may be implemented by any number of video broadcast systems, the details will be described below with respect to a switched digital video (SDV) system. More particularly, a digital video broadcast system allows a multiple system operator (MSO) to deliver television programs and multimedia services to subscribers. In legacy broadcast systems, the MSO sends all of the available programs and services to the subscriber's set-top box on a single cable. A switched digital video (SDV) system is an improvement to the legacy broadcast systems. The SDV system requires less bandwidth to deliver high-bandwidth digital services by allowing the MSO to send only the content requested by a service group, where each service group includes a set of set-top boxes with visibility to a common set of switched edge quadrature amplitude modulator (QAM) devices. To make this possible, the subscriber's set-top box communicates with a network side video server to request the program that the subscriber wants to watch in real time. The SDV system responds by delivering the requested program to the subscriber's service group. Thus, the service group only receives the programs that subscribers in the service group are watching.

Figure 1:
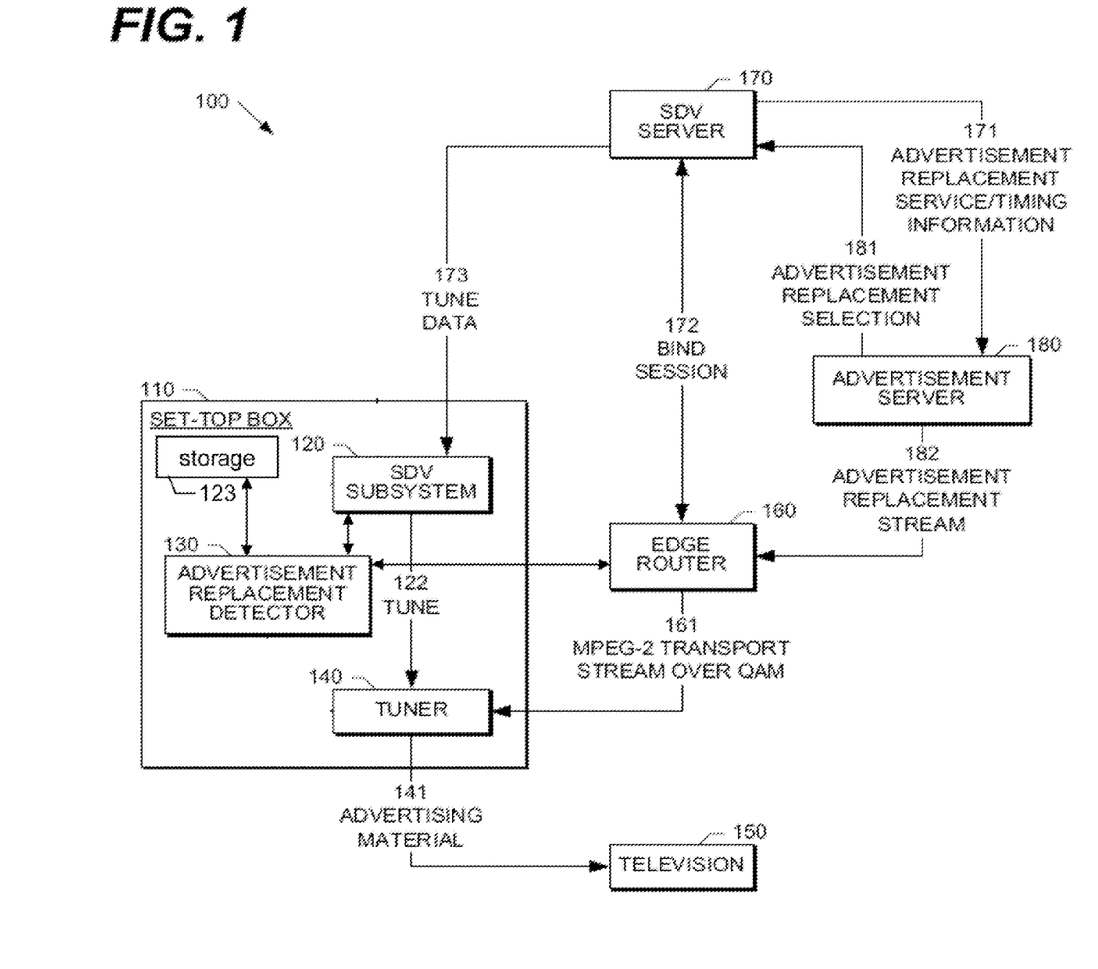
FIG. 1 is a block diagram showing hardware components of a switched digital video (SDV) system.

Turning now to the drawings, where like numerals designate like components, FIG. 1 is a block diagram showing hardware components of a switched digital video (SDV) system 100. SDV system 100 includes a set-top box 110, television 150, edge router 160, SDV server 170, and advertisement server 180. In one embodiment, a network (not shown), such as a hybrid-fiber coaxial (HFC) network, connects the set-top box 110 and the television 150 to the edge router 160, SDV server 170, and the advertisement server 180. In another embodiment, a network (not shown) connects the advertisement server 180 to the edge router 160 and SDV server 170.

The set-top box 110 is a computing device that connects the television 150 and an external signal source, turning the signal into a content stream that the television 150 displays. The set-top box 110 shown in FIG. 1 includes an SDV subsystem 120, advertisement replacement detector 130, tuner 140, and internal storage 123. Internal storage 123 preferably comprises storage such as, but not limited to a Serial ATA (SATA) hard disk drive, optical drive, Small Computer System Interface (SCSI) disk, flash memory, or the like, and is used to store advertisements.

The edge router 160 is a computing device that transfers data between a local area network and a wide area network, choosing the most effective paths to use when sending or receiving data. The edge router 160 shown in FIG. 1 includes quadrature amplitude modulators (QAMs) that enable the transmission of a multiplex of digital streams via a radio-frequency (RF) carrier.

The SDV server 170 is a computing device that receives channel change requests for switched content from the set-top box 110, binds that content to a session on the edge router 160 that is associated with a QAM feeding the service group for the set-top box 110, and responds to the set-top box 110 with the frequency and program number where the content may be found.

The system shown in FIG. 1 utilizes an SDV environment to send a targeted advertisement. In one embodiment, the targeted advertisement is a replacement for the primary network advertisement that is typically shown during a television program or between two television programs. One benefit of using the SDV environment to send targeted advertisements is that targeted advertisements are not required to be transmitted on the network in a continuous manner, and can be switched in based on an insertion decision made by the replacement detector 130. In this particular embodiment, advertisement server 180 provides advertisement replacement detector 130 with targeted advertisements particular to set-top box 110. These advertisements are then stored in storage 123.

In one embodiment of the SDV system shown in FIG. 1, a subscriber uses the set-top box 110 to request a content stream to view on the television 150. The SDV server 170 receives the request for the content stream from the SDV subsystem 120 of the set-top box 110. When the content stream is available, the SDV server 170 will bind a session to the edge router 160 for delivery of the content stream. The edge router 160 then delivers the content stream, as MPEG-2 transport stream over QAM 161, to the tuner 140 which will display the content stream on the television 150.

The advertisement replacement detector 130 shown in FIG. 1 monitors the content streams that the tuner 140 receives in order to detect an opportunity for advertisement replacement. In one embodiment, the advertisement replacement detector 130 detects a trigger in the content stream that indicates that an advertisement transition will occur, where the advertisement server 180 inserted the trigger into the content stream, and the SDV server 170 forwarded the content stream with the trigger to the set-top box 110 via the edge router 160. In another embodiment, the advertisement replacement detector 130 detects a splice point in the content stream that indicates that an advertisement transition will occur. Regardless of the technique to use to detect an advertisement period, when such an advertisement replacement opportunity occurs, the advertisement replacement detector 130 accesses storage 123 and obtains the appropriate advertisements.

In one embodiment, the advertisement replacement service/timing information 171 provides demographic information for the subscriber, time duration for the advertisement segment, identification information for the subscriber, purchasing preferences, and the like that help the advertisement server 180 to select an advertisement that will target the subscriber or an event or occasion.

In response to the receipt of the advertisement replacement service/timing information 171, the advertisement replacement detector 130 prepares advertisements to present to the subscriber. In one embodiment, the subscriber's characteristics and preferences (i.e., demographic information, timing information, identification information, purchasing preferences, and the like), is used by the advertisement replacement detector 130 to select an appropriate advertisement replacement. The SDV server 170 sends a tune data 173 message to the SDV subsystem 120 to provide the tuning information to the set-top box 110. In one embodiment, the tune data 173 message includes timing information to synchronize the set-top box 110 tune with the playing of the replacement target advertisement that the advertisement replacement detector 130 provides as an advertisement replacement stream to SDV subsystem 120, which provides it to tuner 140 at the appropriate time.

As discussed, a current focus for the MSO is the development of targeted advertisement technology (i.e., advertisements that are placed so as to reach consumers based on various traits, such as demographics, purchase history, observed behavior, or the like). In many television programs an advertisement opportunity duration is unknown or variable.

Variable Duration Advertisement Opportunity—the duration of this type of advertisement opportunity is variable.

For advertisement opportunities of variable duration, there may be no exact fit (time-wise) for any group of advertisements with the advertisement opportunity window. Example of this type of advertisement opportunity is a live concert program with multiple sessions with pre-defined breaks in between sessions. A first session may be from 2 pm to 3 pm followed by 30 minutes of break. A second session may be from 3:30 pm to 4:30 pm. In this scenario, a 30 minute break is the advertisement opportunity duration. However, suppose, due to some reason first session is dragged on by 13 minutes and ends at 3:13 pm. This leaves 17 minutes as the advertisement duration, as the second session will start at 3:30 pm. This type of advertisement opportunity is variable in duration whose duration is known only at a start of advertisement opportunity. There may not be an advertisement available which can fit exactly in this type of advertisement opportunity.

Unknown Duration Advertisement Opportunity—the duration of this type of advertisement opportunity is unknown at start of advertisement opportunity. Example of this type of advertisement opportunity is a live sports injury break. Here it is unknown that when the sport will continue. Hence a duration of an advertisement opportunity is unknown.

Known Duration Advertisement Opportunity—For advertisement opportunities of known duration, there is an exact fit (time-wise) for various groups of advertisements with the advertisement opportunity window.

The problem for advertisement replacement detector 130 is how to select appropriate-length advertisements for variable duration advertisement opportunities and unknown duration advertisement opportunities. Preferably selection of such advertisements will allow a largest possible revenue opportunity with the advertisements.

Selection Process:

Prior to describing the advertisement selection process that is executed by advertisement replacement detector 130, the following definitions are provided for various variables:

D—Duration of particular advertisement.

W—Weight of particular advertisement. The weight of a particular advertisement is any positive real number, for example, between 1 and 10, and is used by a service provider (MSO) to place a different importance on particular advertisements. Weight may be based on revenue, priority, time-of-day, . . . , etc.

N—Number of times particular advertisement was played. The value of N can be reset at some scheduled duration like everyday, every week, . . . , etc based on service provider decision.

f(N)—function of N. For this particular embodiment f(N) =N, however, f(N) may be equal to any function of N, for example ½(N).

S—Set of advertisements with smaller durations (e.g., 15 seconds or less).

B—Set of banner advertisements with audio

The advertisement replacement detector 130 will execute the following steps:

1. Advertisement replacement detector 130 retrieves and stores advertisements from advertisement server 180. An advertisement-list is also provided from advertisement server 180 that contains a weight (W) of each advertisement.

2. Advertisement replacement detector 130 prepares set S of very small duration advertisements. In this particular embodiment, S comprises 20 shortest duration advertisements 15 seconds or shorter. However in alternate embodiments, set S may comprise any number of relatively short-duration advertisements (e.g., 40 advertisements less than 20 seconds in duration).

3. Advertisement replacement detector 130 prepares a set B of 10 banner advertisements with audio. In alternate embodiments of the present invention, B may comprises a set of any number (20, 30, 40, . . . , etc.) of banner advertisements.

4. When an unknown duration advertisement opportunity is detected, advertisement replacement detector 130 will execute a second algorithm to select advertisements. In particular advertisement replacement detector 130 selects advertisements from set B or S and sends them to SDV subsystem 120. SDV subsystem 120 inserts the advertisements into the advertisement opportunity window until programming resumes. The advertisements may be repeated if the advertisement opportunity duration exceeds the amount of advertisements provided to SDV subsystem 120.

5. When a variable duration advertisement opportunity is detected, advertisement replacement detector 130 will execute a third algorithm for choosing the best advertisements. In particular, the following steps will be performed:

a) Advertisement replacement detector 130 will prepare a sorted list (L) of advertisements in decreasing order of W/K, where K=Df(N).

b) Advertisement replacement detector 130 will:
determine the advertisement opportunity duration;
start from highest W/K and select advertisements which have durations less than or equal to the advertisement opportunity duration;
increment N of selected advertisement by 1;
decrement the advertisement opportunity duration by duration of selected advertisement; and
select the next advertisement in the list (L).

c) Repeat step b) until no advertisement duration is less than or equal to the advertisement opportunity duration.

d) If advertisement opportunity duration is not zero, advertisement replacement detector 130 selects advertisements from set B or S and sends them to SDV subsystem 120.

6. When a known advertisement opportunity is detected, the advertisement replacement detector will execute a first algorithm. The first algorithm comprises the following steps:

a) determine W/K for each advertisement, where K=Df(N);

b) determine the advertisement opportunity duration;

c) choose a group of advertisements with a highest W/K which have durations equal to the advertisement opportunity duration; and d) increment N by 1 for the selected advertisement.

Figure 2:
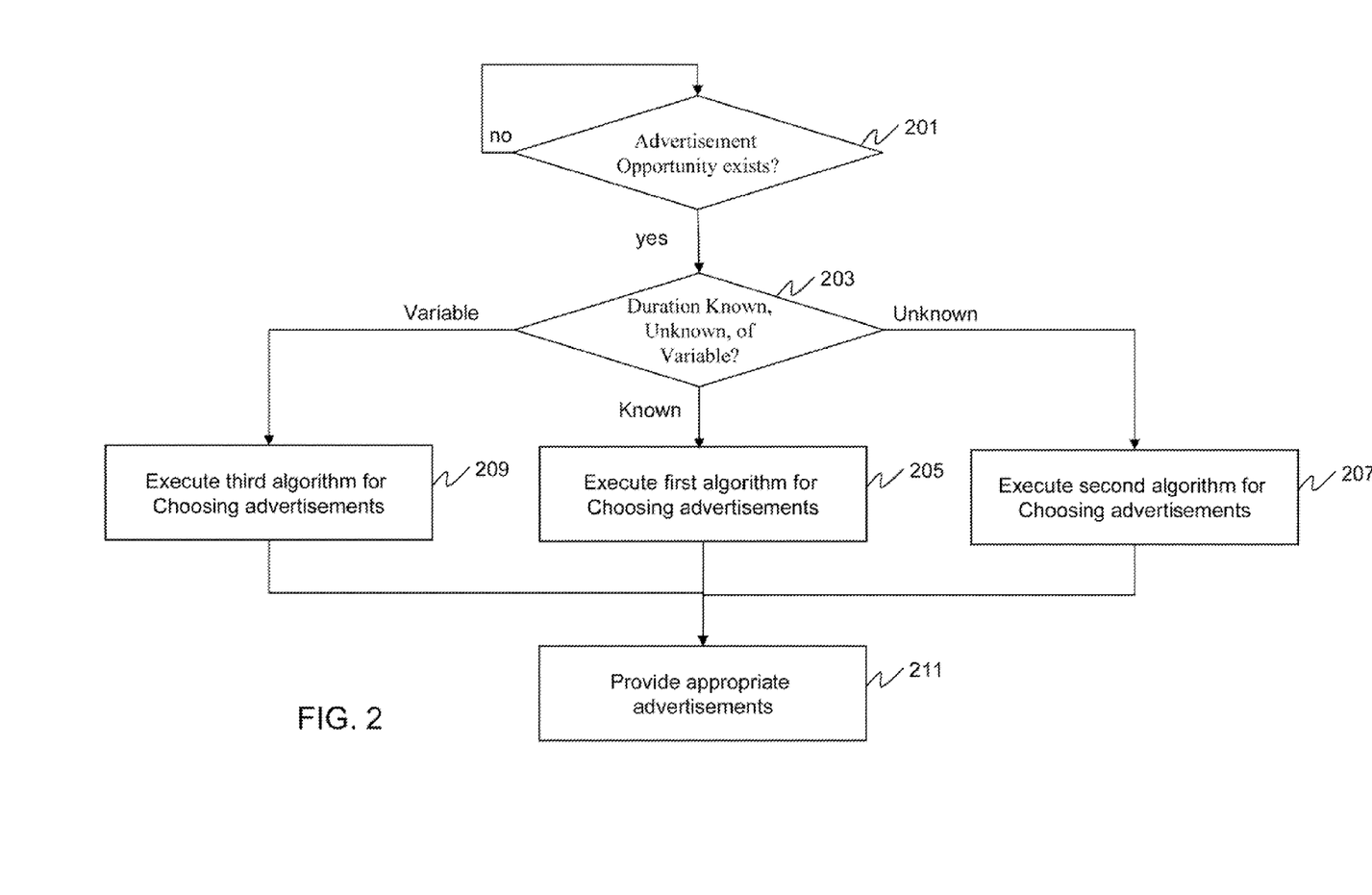
FIG. 2 is a flow chart showing the operation of the SDV system of FIG. 1.

FIG. 2 is a flow chart showing the operation of the SDV system of FIG. 1. The logic flow begins at step 201 where advertisement replacement detector 130 determines that an advertisement opportunity exists. As discussed above, the detection of an advertisement opportunity may be accomplished in any number of ways, but preferably the determination is made by receiving an indication from advertisement replacement service/timing information 171 provided by advertisement server 180. At step 203 a decision is made as to whether or not the advertisement duration is, unknown, variable, or known. If the advertisement duration is known, a first algorithm is run by advertisement replacement detector 130 to choose appropriate advertisements (step 205). If the advertisement duration is unknown, a second algorithm is run by advertisement replacement detector 130 to choose appropriate advertisements (step 207). If the advertisement period is variable, a third algorithm is run by advertisement replacement detector 130 to choose the appropriate advertisements (step 209). The appropriate advertisements are then provided by advertisement replacement detector 130 to SDV subsystem 120 where they are sent to tuner 140 and ultimately to television 150.

Figure 3:
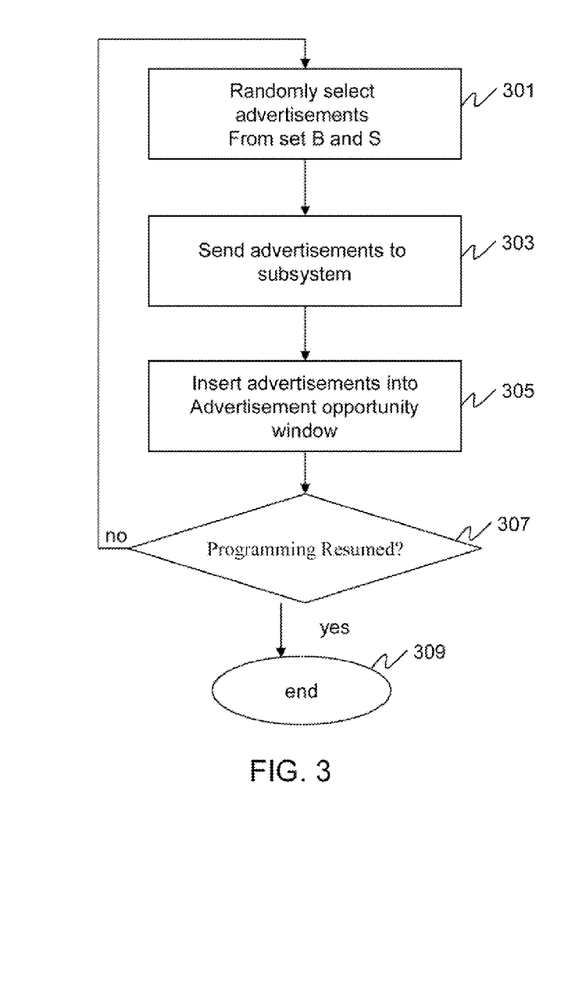
FIG. 3 is a flow chart showing operation of the SDV system of FIG. 1 when selecting advertisements for an unknown-duration.

FIG. 3 is a flow chart showing operation of the SDV system of FIG. 1 when selecting advertisements for an unknown-duration. The logic flow begins at step 301 where advertisement replacement detector 130 randomly selects advertisements from set B and S and sends them to SDV subsystem 120 (step 303). SDV subsystem 120 inserts the advertisements into the advertisement opportunity window. At step 307 advertisement replacement detector 130 determines if programming has resumed. If so, the logic flow ends at step 309, otherwise the logic flow returns to step 301. The advertisements may be repeated if the advertisement opportunity duration exceeds the amount of advertisements provided to SDV subsystem 120.

Figure 4:
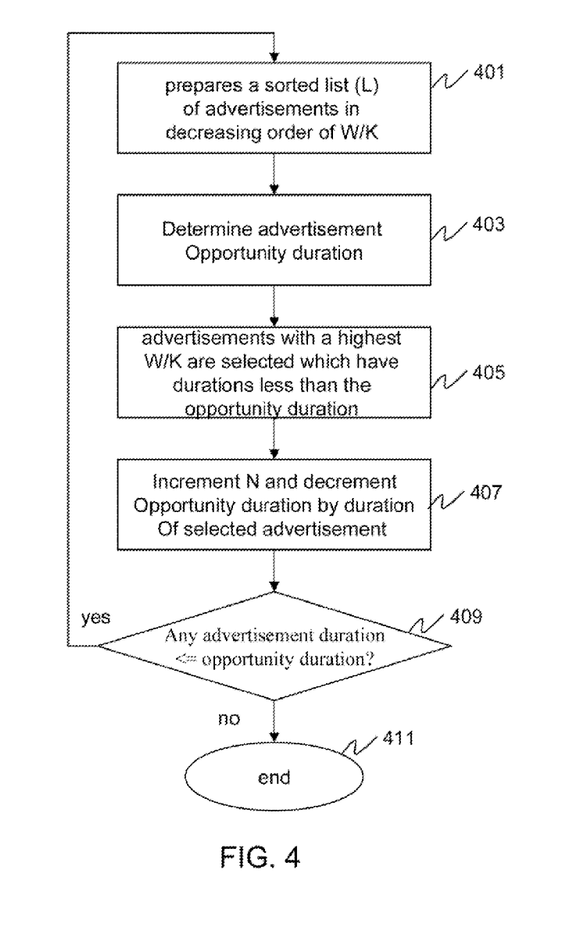
FIG. 4 is a flow chart showing operation of the SDV system of FIG. 1 when selecting advertisements for a variable duration.

FIG. 4 is a flow chart showing operation of the SDV system of FIG. 1 when selecting advertisements for a variable duration. For advertisement opportunities of variable duration, there may be no exact fit (time-wise) for any group of advertisements with the advertisement opportunity window. At step 401 advertisement replacement detector prepares a sorted list (L) of advertisements in decreasing order of W/K, where K=Df(N). At step 403 advertisement replacement detector 130 determines the advertisement opportunity duration and the logic flow continues to step 405 where advertisements with a highest W/K are selected which have durations less than or equal to the advertisement opportunity duration. These advertisements are passed to subsystem 120. At step 407 N is incremented by 1 for the selected advertisement and the advertisement opportunity duration is decremented by the duration of selected advertisement. At step 409 a determination is made if any advertisement has duration less than or equal to the remaining advertisement opportunity duration. If so, the logic flow returns to step 403, otherwise, the logic flow ends at step 411.

Figure 5:
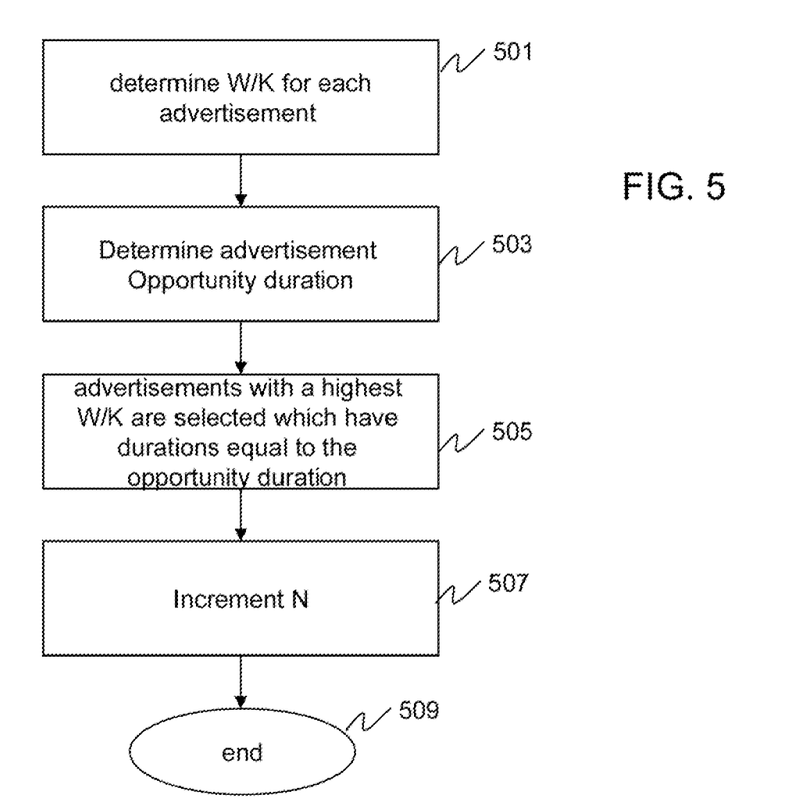
FIG. 5 is a flow chart showing operation of the SDV system of FIG. 1 when selecting advertisements for a know duration.

FIG. 5 is a flow chart showing operation of the SDV system of FIG. 1 when selecting advertisements for a known duration. For advertisement opportunities of known duration, there is an exact fit (time-wise) for various groups of advertisements with the advertisement opportunity window. At step 501 advertisement replacement detector determines W/K for each advertisement, where K=Df(N). At step 503 advertisement replacement detector 130 determines the advertisement opportunity duration and the logic flow continues to step 405. At step 505 a group of advertisements with a highest W/K are selected which have durations equal to the advertisement opportunity duration and are passed to subsystem 120. At step 507 N is incremented by 1 for the selected advertisement and the logic ends at step 509.

While the invention has been particularly shown and described with reference to a particular embodiment, it will be understood by those skilled in the art that various changes in form and details may be made therein without departing from the spirit and scope of the invention. It is intended that such changes come within the scope of the following claims:

The invention claimed is:

1. A method for managing targeted advertisements, the method comprising:
   receiving targeted advertisements;
   storing the targeted advertisements as stored advertisements;
   determining if an advertisement opportunity duration is known, unknown, or variable;
   utilizing a first algorithm to choose advertisements from the stored advertisements when the advertisement opportunity duration is known, wherein utilizing the first algorithm comprises:
      determining W/K for each advertisement, where W is a weight of the advertisement, D is a duration of the advertisement, N is a number of times the advertisement was played, and K is D multiplied by a function of N;
      determining the advertisement opportunity duration; and
      choosing a group of advertisements with a highest W/K which have durations equal to the advertisement opportunity duration;
   utilizing a second algorithm to choose advertisements from the stored advertisements when the advertisement opportunity duration is unknown; and
   utilizing a third algorithm to choose advertisements from the stored advertisements when the advertisement opportunity duration is variable.

2. At least one non-transitory computer-readable medium comprising stored instructions which, when executed by one or more processors, cause the one or more processors to perform the method of claim 1.

3. A method for managing targeted advertisements, the method comprising:
   receiving targeted advertisements;
   storing the targeted advertisements as stored advertisements;
   determining if an advertisement opportunity duration is known, unknown, or variable;
   utilizing a first algorithm to choose advertisements from the stored advertisements when the advertisement opportunity duration is known;
   utilizing a second algorithm to choose advertisements from the stored advertisements when the advertisement opportunity duration is unknown, wherein utilizing the second algorithm comprises:
      creating a set S comprising advertisements from the stored advertisements having smaller durations;
      creating a set B of stored banner advertisements;
      selecting advertisements from set B or set S; and
      inserting the selected advertisements into the advertisement opportunity window until programming resumes; and
   utilizing a third algorithm to choose advertisements from the stored advertisements when the advertisement opportunity duration is variable.

4. At least one non-transitory computer-readable medium comprising stored instructions which, when executed by one or more processors, cause the one or more processors to perform the method of claim 3.

5. A method for managing targeted advertisements, the method comprising:
   receiving targeted advertisements;
   storing the targeted advertisements as stored advertisements;
   determining if an advertisement opportunity duration is known, unknown, or variable;
   utilizing a first algorithm to choose advertisements from the stored advertisements when the advertisement opportunity duration is known;

utilizing a second algorithm to choose advertisements from the stored advertisements when the advertisement opportunity duration is unknown; and utilizing a third algorithm to choose advertisements from the stored advertisements when the advertisement opportunity duration is variable, wherein utilizing the third algorithm comprises:

preparing a sorted list of advertisements in decreasing order of W/K, where for each of the advertisements, W is a weight of the advertisement, D is a duration of the advertisement, N is a number of times the advertisement was played, and K is D multiplied by a function of N;

determining an advertisement opportunity duration; and starting from a highest W/K, selecting advertisements which have durations less than the advertisement opportunity duration.

6. At least one non-transitory computer-readable medium comprising stored instructions which, when executed by one or more processors, cause the one or more processors to perform the method of claim 5.

7. An apparatus comprising:

an advertisement replacement detector receiving targeted advertisements and storing the targeted advertisements as stored advertisements;

the advertisement replacement detector determining if an advertisement opportunity duration is known, unknown, or variable, and utilizing a first algorithm to choose advertisements from the stored advertisements when the advertisement opportunity duration is known, utilizing a second algorithm to choose advertisements from the stored advertisements when the advertisement opportunity duration is unknown, and utilizing a third algorithm to choose advertisements from the stored advertisements when the advertisement opportunity duration is variable;

wherein the first algorithm comprises:

the advertisement replacement detector determining W/K for each advertisement, where W is a weight of the advertisement, D is a duration of the advertisement, N is a number of times the advertisement was played, and K is D multiplied by a function of N;

the advertisement replacement detector determining the advertisement opportunity duration; and the advertisement replacement detector choosing a group of advertisements with a highest W/K which have durations equal to the advertisement opportunity duration.

8. The apparatus of claim 7 wherein the apparatus comprises a cable set-top box.

9. The apparatus of claim 7 further comprising internal storage storing the targeted advertisements.

10. An apparatus comprising:

an advertisement replacement detector receiving targeted advertisements and storing the targeted advertisements as stored advertisements;

the advertisement replacement detector determining if an advertisement opportunity duration is known, unknown, or variable, and utilizing a first algorithm to choose advertisements from the stored advertisements when the advertisement opportunity duration is known, utilizing a second algorithm to choose advertisements from the stored advertisements when the advertisement opportunity duration is unknown, and utilizing a third algorithm to choose advertisements from the stored advertisements when the advertisement opportunity duration is variable;

wherein the second algorithm comprises:

the advertisement replacement detector creating a set S comprising advertisements from the stored advertisements having smaller durations;

the advertisement replacement detector creating a set B of stored banner advertisements;

the advertisement replacement detector selecting advertisements from set B or set S; and the advertisement replacement detector inserting the selected advertisements into the advertisement opportunity window until programming resumes.

11. An apparatus comprising:

an advertisement replacement detector receiving targeted advertisements and storing the targeted advertisements as stored advertisements;

the advertisement replacement detector determining if an advertisement opportunity duration is known, unknown, or variable, and utilizing a first algorithm to choose advertisements from the stored advertisements when the advertisement opportunity duration is known, utilizing a second algorithm to choose advertisements from the stored advertisements when the advertisement opportunity duration is unknown, and utilizing a third algorithm to choose advertisements from the stored advertisements when the advertisement opportunity duration is variable;

wherein the third algorithm comprises:

the advertisement replacement detector preparing a sorted list of advertisements in decreasing order of W/K, where for each of the advertisements, W is a weight of the advertisement, D is a duration of the advertisement, N is a number of times the advertisement was played, and K is D multiplied by a function of N;

the advertisement replacement detector determining an advertisement opportunity duration; and the advertisement replacement detector starting from a highest W/K, selecting advertisements which have durations less than the advertisement opportunity duration.

12. A method for managing targeted advertisements, the method comprising the steps of:

receiving targeted advertisements;

storing the targeted advertisements as stored advertisements;

determining if an advertisement opportunity duration is known, unknown, or variable;

utilizing a first algorithm to choose advertisements from the stored advertisements when the advertisement opportunity duration is known;

utilizing a second algorithm to choose advertisements from the stored advertisements when the advertisement opportunity duration is unknown;

utilizing a third algorithm to choose advertisements from the stored advertisements when the advertisement opportunity duration is variable;

wherein the step of utilizing the first algorithm comprises the steps of:

determining W/K for each advertisement, where W is a weight of the advertisement, D is a duration of the advertisement, N is a number of times the advertisement was played, and K is D multiplied by a function of N;

determining the advertisement opportunity duration; and choosing a group of advertisements with a highest W/K which have durations equal to the advertisement opportunity duration;

wherein the step of utilizing the second algorithm comprises the steps of:

creating a set S comprising advertisements from the stored advertisements having smaller durations;

creating a set B of stored banner advertisements;

selecting advertisements from set B or set S; and inserting the selected advertisements into the advertisement opportunity window until programming resumes; and wherein the step of utilizing the third algorithm comprises the steps of:

preparing a sorted list of advertisements in decreasing order of W/K;

determining an advertisement opportunity duration; and starting from a highest W/K, selecting advertisements which have durations less than the advertisement opportunity duration.

13. At least one non-transitory computer-readable medium comprising stored instructions which, when executed by one or more processors, cause the one or more processors to perform the method of claim 12.

* * * * *